Aug. 25, 1964   B. T. HERBST   3,145,521
SELF-PROPELLED FRUIT CATCHING APPARATUS
Filed April 3, 1961   5 Sheets-Sheet 1
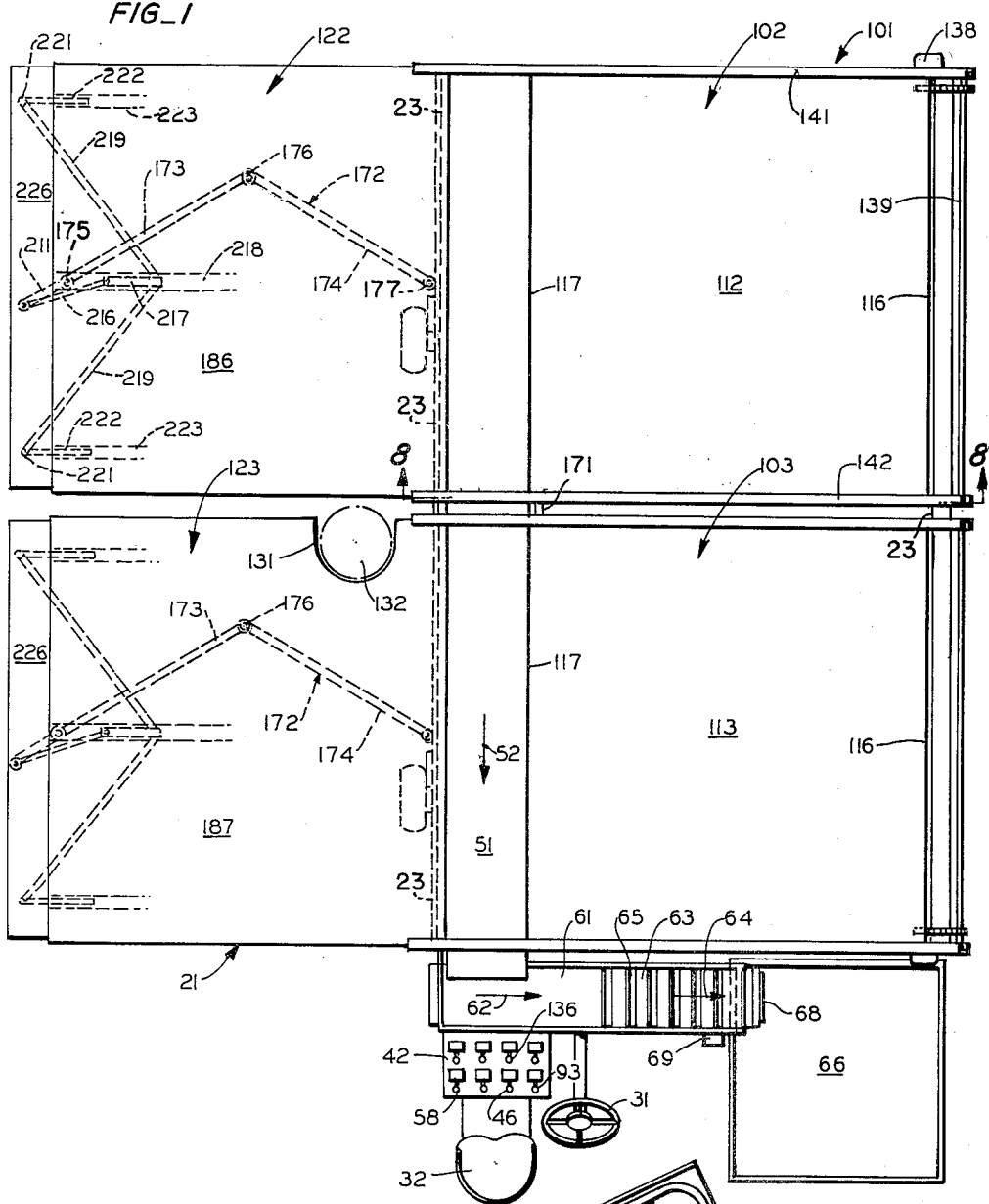
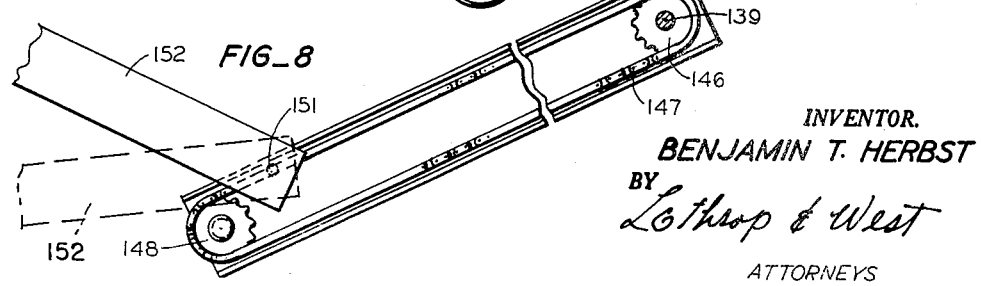
INVENTOR.
BENJAMIN T. HERBST
BY
Lothrop & West
ATTORNEYS

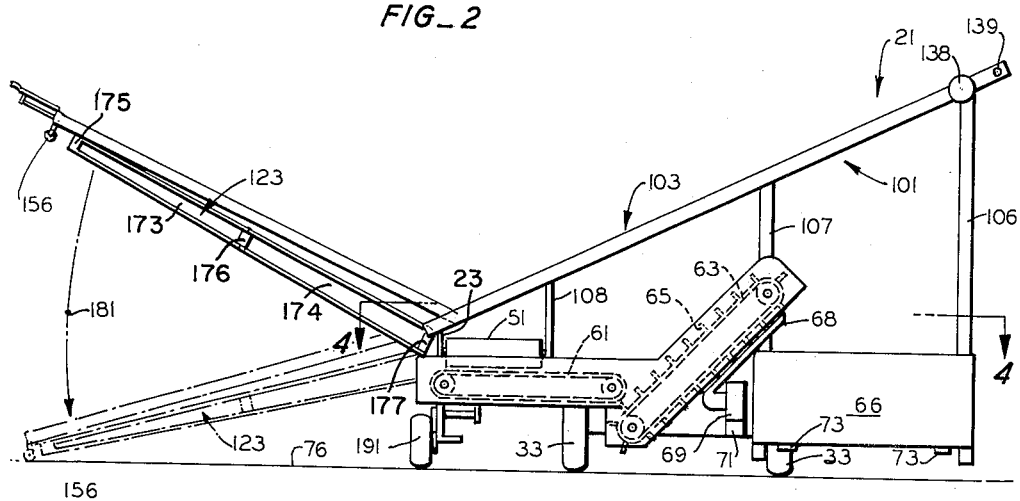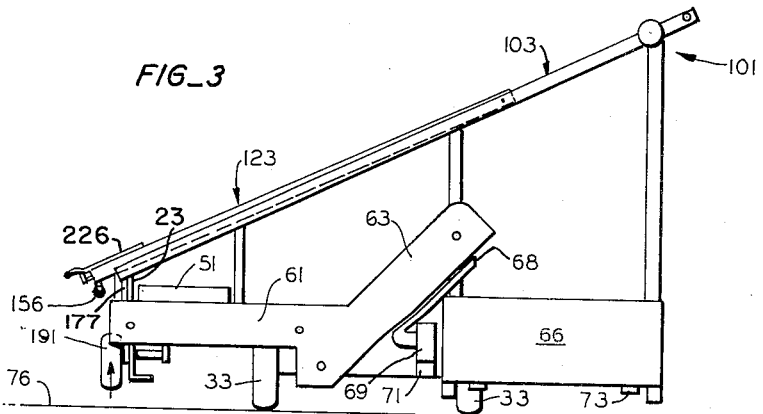

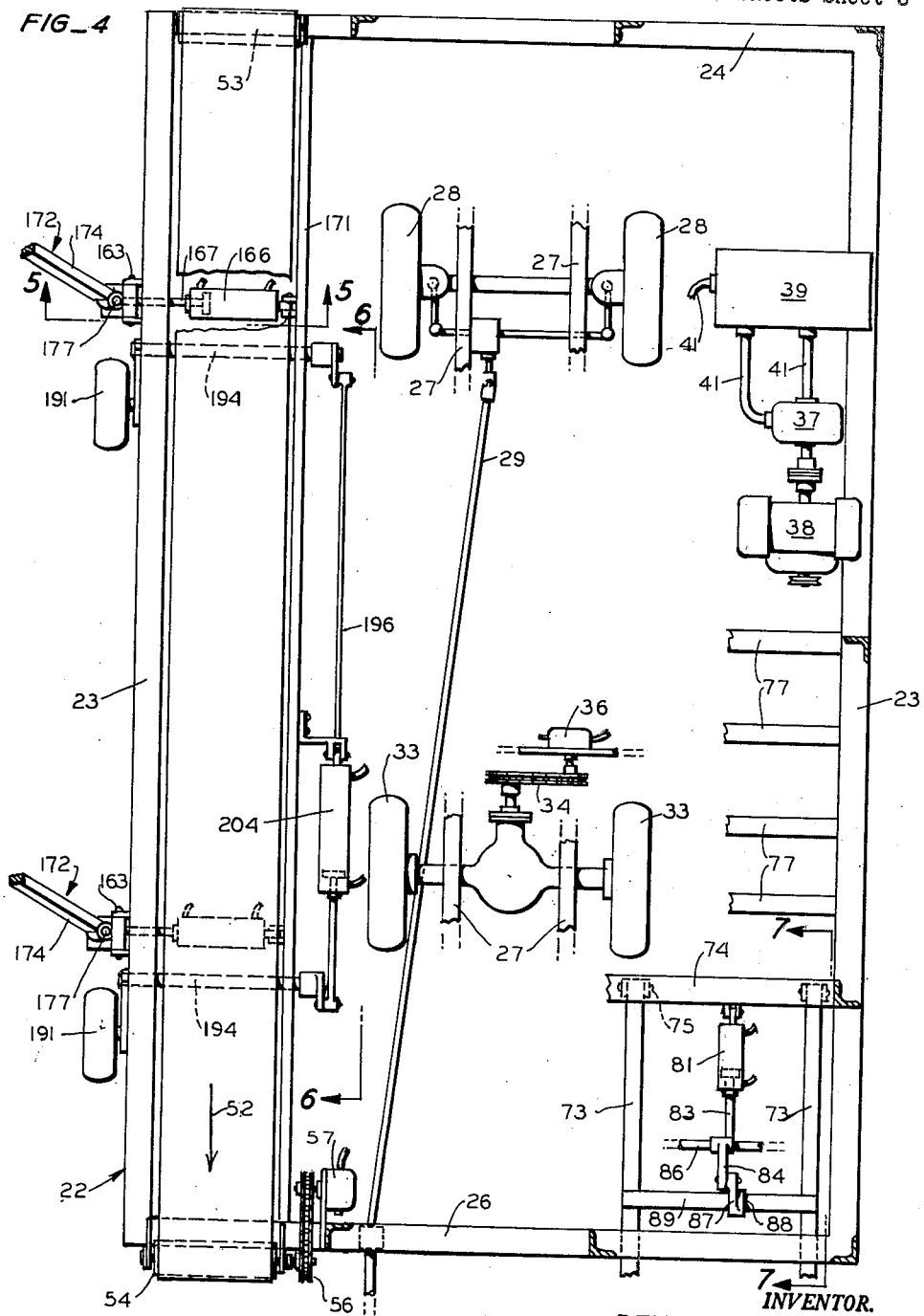

Aug. 25, 1964  B. T. HERBST  3,145,521
SELF-PROPELLED FRUIT CATCHING APPARATUS
Filed April 3, 1961  5 Sheets-Sheet 4
FIG_5
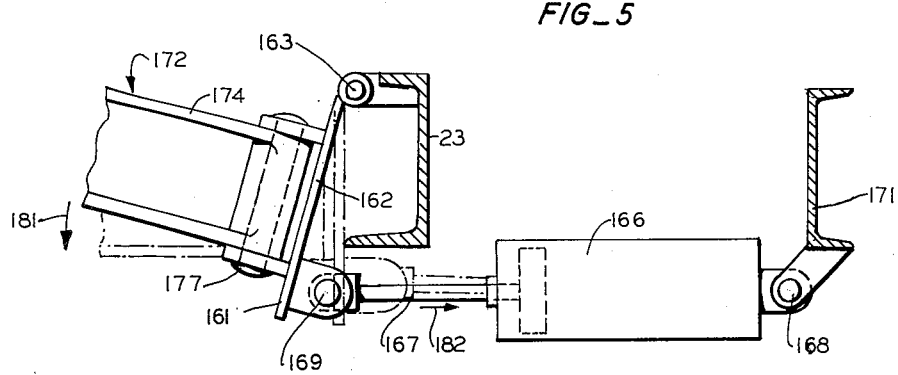
FIG_6
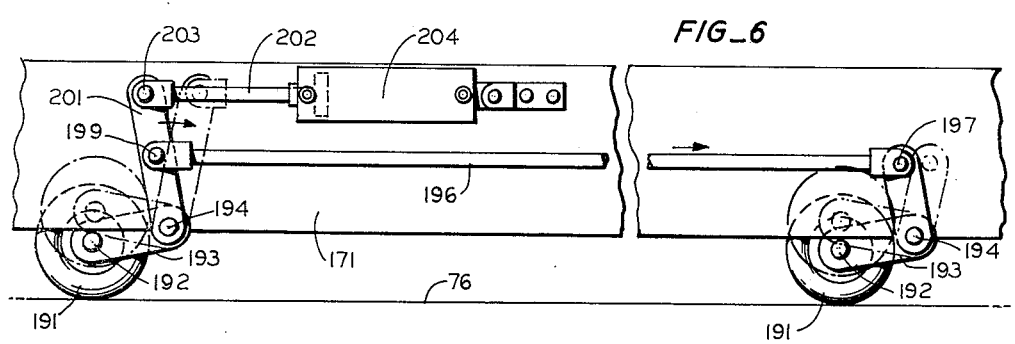
FIG_7
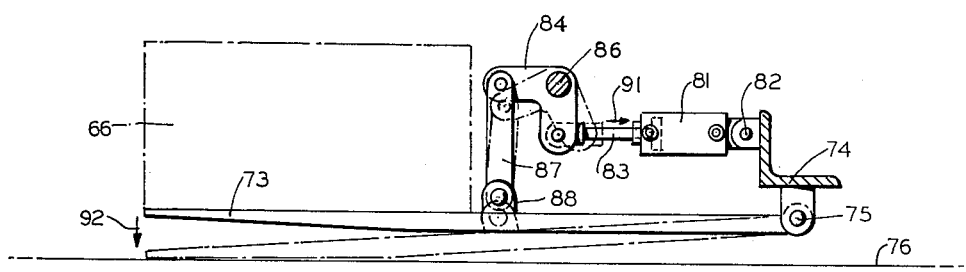
INVENTOR.
BENJAMIN T. HERBST
BY Lothrop & West
ATTORNEYS Aug. 25, 1964   B. T. HERBST   3,145,521
SELF-PROPELLED FRUIT CATCHING APPARATUS
Filed April 3, 1961   5 Sheets-Sheet 5
FIG_10
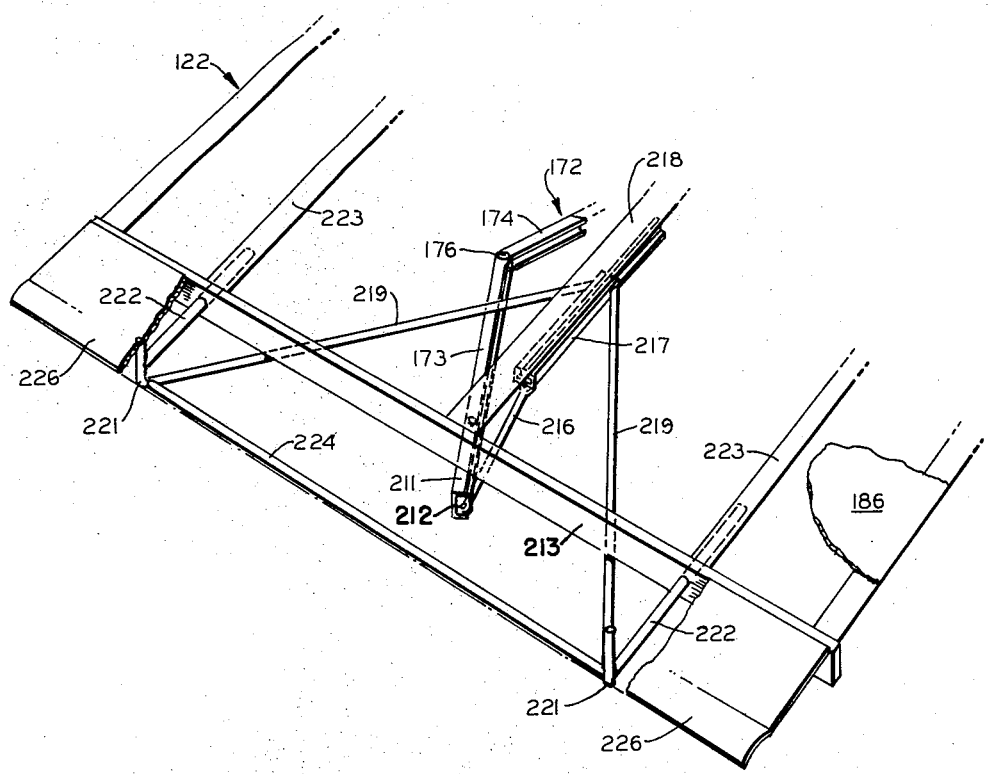
INVENTOR.
BENJAMIN T. HERBST
BY Lothrop & West
ATTORNEYS

United States Patent Office

3,145,521
Patented Aug. 25, 1964

---

3,145,521
SELF-PROPELLED FRUIT CATCHING APPARATUS
Benjamin T. Herbst, P.O. Box 17, Esparto, Calif.
Filed Apr. 3, 1961, Ser. No. 100,374
7 Claims. (Cl. 56—329)

The invention relates to devices for catching crops, such as fruits and nuts, shaken from trees.

Many different types of harvesting frames have, over the years, been developed and used. Almost all have had, in common, some kind of catching surface adapted to underlie the branches of the tree to be harvested. After placement of the catching surface, the crop is separated from the tree, as by knocking or shaking of the branches. The crop then falls downwardly and onto the catching surface where it is transferred to suitable containers.

The majority of these earlier devices have required a number of men to operate them, thus impairing the efficacy of these machines as labor-saving devices. Still others have had to be operated in pairs, with one device located on each side of a tree, an arrangement which again requires more personnel to operate. Furthermore, still other machines are not self-propelled, thus requiring that a tractor, or tractors, be tied up during the harvesting period in order to move the harvesting devices.

It is therefore an object of the invention to provide a fruit catching apparatus which is self-propelled.

It is another object of the device to provide a self-propelled fruit catching apparatus which is capable of efficient operation with a minimum number of workers.

It is yet another object of the device to provide a fruit catching apparatus which, as a single unit, is capable of completely encompassing the area below a tree to be harvested.

It is still another object of the invention to provide a fruit catching apparatus which can be driven along a highway in order expeditiously to move the apparatus from one location to another.

It is a further object of the invention to provide a fruit catching apparatus which conveniently provides a support for a mechanical tree shaking device.

It is yet a further object of the invention to provide a fruit catching apparatus which separates leaves and which transfers the harvested fruit into a bulk container which is carried on the apparatus itself.

It is still a further object of the invention to provide an apparatus which carries on it spare containers for carrying the fruit which is harvested.

It yet is another object of the invention to provide a fruit catching apparatus which is capable of harvesting a wide variety of fruits and nuts.

It is an additional object of the invention to provide a fruit catching apparatus which is fast in operation yet which provides a high yield of the fruit which drops from the tree.

It is another object of the invention to provide a generally improved self-propelled fruit catching apparatus.

Other objects, together with the foregoing, are attained in the embodiment described in the following description and shown in the accompanying drawings in which:

FIGURE 1 is a top plan view of the apparatus showing the movable frames in extended position, with the trunk of a tree to be harvested being shown in outline;

FIGURE 2 is an elevational view from the after end, the operator's seat, control panel and steering mechanism being removed for greater clarity of disclosure, the attitude of the movable frame in its intermediate position being shown in outline;

FIGURE 3 is a view comparable to that of FIGURE 2 but illustrating the movable frame in a retracted position;

FIGURE 4 is a fragmentary sectional view, the plane of the section being indicated by the line 4—4 in FIGURE 2, and showing the general chassis and conveyor construction, together with the actuating mechanisms of the apparatus;

FIGURE 5 is a fragmentary sectional view, to an enlarged scale, of the movable frame elevating mechanism, the plane of the section being indicated by the line 5—5 in FIGURE 4;

FIGURE 6 is a fragmentary side view of the elevating mechanism for the load-center supporting wheels, the plane of the view being indicated by the line 6—6 in FIGURE 4;

FIGURE 7 is a fragmentary section, to an enlarged scale, of the fork lift elevating mechanism, the plane of the section being indicated by the line 7—7 in FIGURE 4;

FIGURE 8 is a fragmentary sectional view of the movable frame extending mechanism, the plane of the section being indicated by the line 8—8 in FIGURE 1;

FIGURE 9 is a diagram to an enlarged scale of the hydraulic control console or panel board located in front of the operator's position, as appears in FIGURE 1; and FIGURE 10 is a perspective view of the extension frame mounted on the longitudinal side of a movable frame showing how the extension frame projects outwardly as the movable frame is extended.

While the apparatus of the invention is susceptible of numerous physical embodiments, depending on the environment and requirements of use, substantial numbers of the herein shown and described embodiment have been made and used and have performed in an eminently satisfactory manner.

The fruit-catching apparatus, generally designated by the reference numeral 21, comprises a chassis 22, or framework (see FIGURE 4) including a pair of longitudinal members 23, a forward transverse member 24 and an after transverse member 26 together with other suitable structural members, such as the fore and aft members 27, supported by a plurality of ground-engaging wheels. The wheels are adapted for guided movement along a predetermined path and include a forward pair of steering wheels 28 maneuvered by the customary steering rod 29 and wheel 31 conveniently located adjacent the operator's seat 32 (see FIGURE 1). Supporting the after end of the chassis is a pair of drive wheels 33 driven by a chain 34 actuated by a hydraulic motor 36.

The motor 36, together with the other drive mechanisms, subsequently to be described, derive their power from the force of hydraulic fluid from a pump 37. The pump 37, in turn, is actuated by an internal combustion engine 38 and, along with a fluid reservoir 39 and conventional fluid conduits 41 comprises the hydraulic drive system. A plurality of valves and their attendant levers mounted on a console 42, or control panel (see FIGURES 1 and 9) in front of the operator's position 32 provides ready control over all movements of the apparatus.

In the case of the drive or propulsion unit 36, control is effected by the valve lever 46 (see FIGURE 1) having in front of it a plate 47 (see FIGURE 9 ) indicating that the chassis can be propelled either forwardly or backwardly by appropriate movement of the valve lever 46. In like manner, the other seven plates and their attendant valve levers provide the operator at a single station with means for controlling all movements of the various operating mechanisms of the fruit-catching apparatus.

Included among these mechanisms is a fore and aft conveyor belt 51 located along one side of the chassis and having its upper run moved in a rearward direction indicated by the arrow 52, the forward end of the belt being reeved over a forward roller 53 and the after end over a live roller 54 driven, through intermediate sprockets and a chain 56 by a belt roller drive motor 57, the motor 57 deriving its power, as explained above, from the pump 37 and controlled by a valve lever 58 on the console 42.

Adjacent and below the after end of the fore and aft conveyor 51 is a transverse horizontal belt 61 having its upper run movable in the direction indicated by the arrow 62, the belt 61 being driven by a mechanism substantially identical with that shown and described in connection with the fore and aft conveyor 51.

A third belt 63, also driven by a mechanism substantially identical with that heretofore described, comprises an upper run movable in the transverse direction of the arrow 64, the belt having a plurality of flights 65 mounted thereon. The left hand end of the belt 63 (see FIGURES 1 and 2) is located below the discharge end or outfall, of the belt 61 and the belt 63 is inclined so that its upper, right-hand end is above and partially overhangs a bin 66 adapted to receive and hold a substantial amount of the fruit. A suction nozzle 68 connected to the eye of a suitably driven blower 69 sucks material of low specific gravity, such as leaves and twigs, from the outfall of the inclined conveyor 63 and blows this light material rearwardly and onto the ground through a discharge conduit 71.

The bin 66, or box, is supported on a pair of forks 73 (see FIGURES 4 and 7) pivotally mounted on a transverse structural member 74 by pins 75. The forks are movable between two positions, an upper position (shown in full line in FIGURE 7) and a lower position (indicated in outline in FIGURE 7) against the ground 76. When full, the bins are quite heavy weighing perhaps several hundred pounds. Thus, a full bin would be difficult to dislodge when the forks are in their upper horizontal position. However, with the forks inclined rearwardly and downwardly to their lower position, the box slides off of its own accord and is deposited on the ground as the apparatus moves forwardly, the box then awaiting pick-up by other box-handling equipment. Conveniently, one or more spare empty boxes are carried on the apparatus, supported by a plurality of transverse structural members 77 (see FIGURE 4). Consequently, as soon as a full box is lowered to and deposited on the ground, an empty box is placed on the forks 73 and the forks are raised to their upper position, ready for continued loading.

Movement of the forks is effected by a hydraulic cylinder 81 pivoted at 82 on the member 74 and a plunger 83 pivotally mounted on a bell-crank 84 rockable about a pin 86. A link 87 pivotally attached both to the bell-crank 84 and a bracket 88 on a cross-member 89 connecting the forks 73 transmits the movement of the plunger to the forks. Thus, as shown in FIGURE 7, forward movement of the plunger 83 in the direction indicated by the arrow 91 causes the forks to lower in the direction shown by the arrow 92. Reference to FIGURES 1 and 9 shows that the operator can control the movement of the forks by suitable manipulation of the bin control lever 93.

Having described the flow of harvested material rearwardly along the fore and aft conveyor, thence transversely, first horizontally, then upwardly for discharge into the bin across the suction trash separator, reference will now be had to the structure and operation of the fruit catching frames, themselves.

As appears most clearly in FIGURES 1-3, the catching frames, generally designated by the reference numeral 101, comprise an inclined pair of fixed frames 102 and 103 mounted on and over the chassis. The fixed frames are in substantially co-planar relation and slope downwardly from the right-hand side of the apparatus, as shown in FIGURES 2 and 3, toward the fore and aft conveyor belt 51 located along the left-hand side of the apparatus. Supporting the fixed frames is a plurality of vertical structural members 106, 107 and 108 located at suitable intervals along the chassis.

Stretched fairly tightly over the fixed frames 102 and 103 are sheets 112 and 113, respectively, of material, such as rubberized canvas, foam rubber or other material appropriate to the type of fruit being dealt with. The sheeting extends laterally from an upper margin 116 (see FIGURE 1) to a lower margin 117 adjacent to and slightly overhanging the fore and aft conveyor 51 so that any fruits or nuts falling on the fixed frame sheets roll downwardly and drop on to the belt, to be carried rearwardly, thence transversely into the bin.

In addition to the fixed frames 102 and 103, a pair of laterally movable and upwardly inclinable frames is also provided. Each of the movable frames, generally designated by the reference numerals 122 and 123, is independently actuable, the movable frames being translatable from the position shown in FIGURE 3, wherein the movable frames 122 and 123 overlie their corresponding subjacent fixed frames 102 and 103, to a second position shown in outline in FIGURE 2 and to a third position shown in full line in FIGURE 2.

Each of the movable frames is substantially identical with the other except for the recess 131, or collar, formed in the leading edge of the after movable frame 123 to receive the trunk 132 of the tree being harvested. Consequently, it is felt that a description of one of the movable frames, for example the forward movable frame 122, will serve also to describe the other.

Lateral translation of the movable frame 122, or front wing, from the retracted position shown in FIGURE 3 to the extended position shown in outline in FIGURE 2 is effected by manipulation of the lever 136 on the console in the appropriate direction as indicated by the plate 137 (see FIGURE 9). This movement causes a hydraulic motor 138 (see top right hand corner of FIGURE 1 to rotate, and thus rotating, through gears and a chain, a longitudinal bar 139 journaled between the upper ends of the pair of transverse members 141 and 142 forming the forward and after ends of the forward fixed frame 102.

Mounted on the rear end of the rotatable bar 139 is a gear 146 having reeved thereon a chain 147, the chain 147 also being reeved about a lower idler gear 148 (see FIGURE 8). A pin 151 secured to the chain 147 serves as a pivot for the after transverse member 152 of the forward or front wing 122. A comparable chain and pin drive is provided in the forward transverse member 141 of the forward fixed frame, the forward chain also being actuated by the longitudinal rod 139.

Thus, with the forward movable frame overlying the forward fixed frame, actuation of the motor 138 in the appropriate direction will translate the pair of pins 151 laterally, urging the forward movable frame 122 laterally to the left and into the extended intermediate position shown in outline in FIGURE 2.

It is to be noted that the outboard or left hand side of the movable frame is provided with a pair of wheels 156 engageable with the ground 76 and serving to support the outboard side of the movable frame as it moves to fully extended position. Preferably these wheels are of the caster variety which will orient themselves toward the direction of resultant motion. In other words, the casters 156 will turn in the proper direction even though the movable frame is extending laterally and the entire apparatus is moving forwardly at the same time.

Upon reaching the extended position shown in outline in FIGURE 2, the front wing can be swung upwardly to the full line position in which the angle of inclination of the movable wing is approximately equal to and in mirror symmetry with the opposite or corresponding fixed frame.

Tilting of the movable front wing is effected by rocking outwardly, toward the left (see FIGURE 5) the lower end 161 of a plate 162 mounted on a horizontal hinge pin 163 secured to the left hand one of the longitudinal chassis members 23 (see FIGURES 4 and 5). The plate 162 is swung by a hydraulic cylinder 166 and plunger 167 pivotally mounted at 168 and 169, respectively, to a longitudinal chassis member 171 and to the lower end 161 of the plate 162.

Outward rocking of the lower end of the plate 162 causes an upward tilting of an elbow member 172, the elbow member including (see FIGURE 1) an outer arm 173 pivoted to an inner arm 174 at an elbow 176. The inner end of the inner arm 174 is pivotally mounted on a substantially vertical pin 177 mounted on the rockable plate 162 and the outer end of the outer arm 173 is hinged at 175 to the outboard side of the wing. Thus, when the movable wing 122 is laterally moved between retracted and extended position the elbow member 172 moves, respectively, between a bent position (not shown) and the substantially unbent or extended position shown most clearly in FIGURE 1.

Then, with the wing and the elbow member in extended position, the rockable plate 162 is swung outwardly to the full-line position shown in FIGURE 5. Concurrently, the elbow member 172 and the front wing 122 supported by the elbow member are swung upwardly to assume the full line position shown in FIGURE 2. Lowering of the wing, on the other hand, in the direction indicated by the arrow 181, is effected by retraction of the plunger in the direction of the arrow 182.

After the wing is lowered to the position shown in outline in FIGURE 2, the operator reverses the direction of rotation of the motor 138 and the shaft 139 so that the chain 147 (see FIGURE 8) moves the pin 151 upwardly and toward the right, thus retracting the wing member 152 from the position shown in outline in FIGURE 8 to the retracted position shown in full line in FIGURE 3. It is to be noted that as the wing retracts the elbow member 172 folds or bends sharply so that in fully retracted position the outer arm 173 is in face to face engagement with the inner arm 174 and the inner arm 174 lies in face to face engagement with the adjacent fore and aft rail 23 (see FIGS. 3 and 5). The elbow member 172, in other words, folds and unfolds as the wing to which it is hinged at 175 retracts and extends, respectively. The major function of the elbow member 172 is to lift and support the wing in the upwardly inclined attitude shown in full line in FIG. 2, upward lifting of the elbow being effected, as previously explained, by tilting outwardly the bottom end 161 of the plate 162 (see FIG. 5) on which the innermost hinge 177 of the elbow member 172 is mounted.

As previously stated, each of the movable frames is independently actuable and each is not only laterally extendable and retractable (so as to overlie the opposed fixed frame) but it is also tiltable or inclinable so that fruit dropping on the respective sheeting 186 and 187 stretched across the front wing 122 and the back wing 123 will roll downwardly and onto the fore and aft conveyor 51.

With the wings in laterally extended and raised condition, a counterbalance or support for the left-hand side of the apparatus (see FIGURE 2) is provided by a pair of retractable outrigger wheels 191. As appears most clearly in FIGURES 4 and 6, each of the wheels is rotatably mounted on an axle 192 attached to a rockable lever 193 mounted on a shaft 194 journaled in the longitudinal chassis members 23 and 171. The shafts 194 are rockable in unison by a longitudinal rod 196 pivotally mounted at one end 197 on a lever 198 secured to the adjacent one of the shafts 194 and at the other end 199 to an arm 201 secured to the adjacent one of the shafts 194. The arm 201, in turn, is actuated by a plunger 202 pivotally mounted at 203 and translated by hydraulic force in a cylinder 204 mounted on the chassis member 171. Although useful as a counterbalance, when harvesting occurs, the outrigger wheels 191 are retracted upwardly, to the location shown in full line in FIGURE 3 and in outline in FIGURE 6, when the wings are retracted over the fixed frames, and the apparatus is to be moved to another location.

When harvesting is to be effected, the apparatus is directed to a path parallel to a row of trees, the wings 122 and 123 being in retracted position, as appears in FIGURE 3. The tree 132 is approached so that the tree is spaced, relative to the left hand side of the fore and aft conveyor 51, approximately as shown in FIGURE 1. With the outrigger wheels 191 down, and shortly after the front end of the apparatus passes the tree, the apparatus being in forward motion, the rear wing 123 is laterally extended by the operator. The apparatus is concurrently guided by the operator so that the recess 131 in the front end of the back wing 123 registers with the tree 132. As the tree assumes the location shown in FIGURE 1, the apparatus is stopped and the front wing is run out. Then, both of the movable wings are swung upwardly to the inclined attitude shown in full line in FIGURE 2.

At this juncture the various conveyor belts are operating and shaking or knocking of the tree branches is undertaken. The apparatus serves as an especially convenient mounting for any one of the presently available commercial tree shakers. As shaking occurs, the fruit falls to the sheeting where it is directed toward the various conveyors and into the bin.

It is particularly to be noted that the combination of the fixed and movable frames substantially underlies the entire tree, clear to the drip line of the tree. Thus, one unit serves to catch the entire crop.

After the fruit from the tree is collected, the front wing 122 is retracted. The operator then backs up the apparatus until the front end of the back wing 123 is clear of the tree and the back wing 123 is retracted. The vehicle is then moved forwardly to the next tree in the row, where the foregoing cycle is repeated.

It has been found, that in some kinds of orchards and with some kinds of crops, it is advantageous to extend, in effect the transverse length of the movable wings 122 and 123 so that the tree 132 is somewhat more centrally located, transversely, than the location it assumes in FIGURE 1.

I have therefore provided a laterally extensible frame adjacent the left hand side of each of the movable wings. FIGURE 10 is a perspective view of one of the movable wings, with the sheeting removed to disclose the operative structure.

An extension 211 is mounted on the outer end of the outer arm 173 of the elbow joint member 172. Thus, when the wing is extended outwardly and the elbow joint member 172 swings from bent position to the substantially extended location shown in FIGURES 1 and 10, the extension 211, being in alignment with the outer arm 173, also swings toward a substantially outwardly extended position. In other words, the outer end 212 of the extension 211, swings outwardly from a first location in juxtaposition to the longitudinal side member 213 of the movable wing to a second position outwardly spaced therefrom. Pivotally mounted on the outermost end 212 is a link 216 pivotally mounted on a sleeve 217 slidably mounted on a transverse structural member 218 of the wing. Secured to the inner end of the sleeve 217 is a yoke 219 whose arms extend outwardly, the outer ends 221 of the yoke 219 being provided with inwardly projecting rods 222 slidable in corresponding guide tubes 223. Mounted on a longitudinal bar 224 connecting the ends 221 of the yoke is an elongated metal sheet 226, such as aluminum. The inner side of the sheet 226 substantially overlaps the outer side of the wing in retracted position of the wing but projects outwardly as the wing extends outwardly so that in outermost position of the wing, the aluminum extension, and, more particularly, the inner margin thereof, overlaps the sheeting of the wing only slightly. The extension member therefore serves laterally to enlarge the extent of the projected movable wings yet does not add significantly to the width of the wing when the wing is in retracted position, a factor of importance in respect to travel of the apparatus along public roadways.

It can therefore be seen that I have provided a highly maneuverable, speedy and compact unit for the harvesting of tree crops, and one whose operation requires but a minimum of labor.

What is claimed is:

1. A self-propelled harvester comprising:
   a. a chassis supported on ground-engaging wheels;
   b. a pair of fore and aft fixed frames mounted on said chassis and inclined laterally from one side of said chassis downwardly toward the other side thereof;
   c. a pair of movable frames each having one side pivotally and movably mounted on a corresponding one of said fixed frames, said movable frames being inclined laterally upwardly in an operative position substantially in mirror symmetry with respect to said fixed frames, said movable frames being adapted to assume a lowered position adjacent the ground and an inoperative position adjacent to and overlying said fixed frames; and
   d. means on said chassis for moving each of said movable frames independently of the other.

2. The apparatus of claim 1 wherein each of said fixed frames includes a chain translatably mounted both on the laterally disposed forward and after ends of said fixed frame, and each of said movable frames includes a pivot member both on the forward and after ends of said movable frame and adjacent said one side thereof, said pivot members each being connected to the adjacent one of said translatable chains on said fixed frame, and means for translating said chains to effect lateral movement of said pivot members and said movable frame relative to said fixed frame.

3. The apparatus of claim 2 further characterized by a movable frame supporting member underlying and supporting each of said movable frames, each of said supporting members including a vertical plate rockably mounted on said chassis adjacent said other side thereof for movement about a horizontal axis, a first arm pivotally mounted on said plate for movement about a vertical axis, and a second arm pivotally mounted on said first arm and on said movable frame, said first and second arms being movable between a fore and aft folded position and a lateral unfolded position in dependence upon the lateral movement of said movable frame, said arms being capable of lifting and supporting said movable frame as said plate is rocked from vertical to inclined attitude.

4. The apparatus of claim 1 wherein each of said movable frames includes a laterally extensible and retractable sheet slidably mounted on the other side of said movable frame, and means connecting said sheet and said movable frame for extending and retracting said sheet in dependence upon the movement of said movable frame.

5. The apparatus of claim 1 further characterized by a fore and aft conveyor belt mounted on said chassis below the lower sides of said frames in operative positions thereof to receive and carry away the run-off from said frames.

6. A self-propelled harvester comprising:
   a. a chassis supported on ground-engaging wheels;
   b. a fore and aft fixed frame mounted on said chassis, said fixed frame being inclined laterally downwardly from a high side located on one side of said chassis to a low side located on the other side of said chassis;
   c. a fore and aft movable frame disposed in an overlying position with respect to said fixed frame and being slidably mounted thereon for downward lateral movement from said overlying position to a laterally extended and downwardly inclined position adjacent the ground, said movable frame also being pivotally mounted on said fixed frame for upwardly inclined movement of said movable frame to a laterally extended and upwardly inclined position substantially in mirror symmetry with respect to the inclination of said fixed frame.

7. The apparatus of claim 6 further characterized by a second substantially identical fixed frame and a second substantially identical movable frame, said second movable frame being independently actuable and having formed in the leading edge thereof an opening to receive the trunk of a tree to be harvested.

References Cited in the file of this patent

UNITED STATES PATENTS

| | | |
|---|---|---|
| 1,962,668 | Olney | June 12, 1934 |
| 2,386,881 | Phillips | Oct. 16, 1945 |
| 2,692,470 | Boman | Oct. 26, 1954 |